April 15, 1930. E. S. EVANS 1,754,819
AUTOMOBILE TIE-DOWN DEVICE
Filed Oct. 31, 1921

Inventor
Edward S. Evans
By T. K. Bryant,
Attorney

Patented Apr. 15, 1930

1,754,819

UNITED STATES PATENT OFFICE

EDWARD S. EVANS, OF DETROIT, MICHIGAN, ASSIGNOR TO THE EVANS AUTO LOADING CO. INC., OF DETROIT, MICHIGAN, A CORPORATION OF DELAWARE

AUTOMOBILE TIE-DOWN DEVICE

Application filed October 31, 1921. Serial No. 511,599.

In loading automobiles, or other vehicles, in or on cars, it is important that the vehicle shall be well anchored in order that it may not be jarred or forced out of position in transit.

Therefore, to accomplish this with absolute positiveness and with a minimum amount of time, labor and expense devoted thereto and without danger of damage to the vehicle, is the primary object of this invention.

More specifically stated, an object of the invention is to provide automobile tie-down devices in the nature of anchor straps which may be previously prepared, and when the vehicle is in position for shipment, the anchor straps may be quickly attached to retain the vehicle in position, and then after the vehicle has arrived at its destination, the anchors may be quickly removed and again used in the same manner as before.

Another object of the invention is to provide an anchor strap of the above kind constructed of springy or resilient metal and shaped so as to be slightly elastic whereby the automobile will be allowed to shift slightly under cushion for absorbing the shocks and jars in such manner as to prevent serious damage to the automobile.

Still another object of the invention is to provide an anchor strip comprising a strap of flexible material bent in the form of a loop and efficiently held at its ends in a novel manner to floor securing plates adapted to be secured to the floor by suitable holdfast devices such as nails.

Other minor objects and particular advantages of the invention will suggest themselves in the course of the following description and that which is new will be set up in the appended claims.

Figure 1:
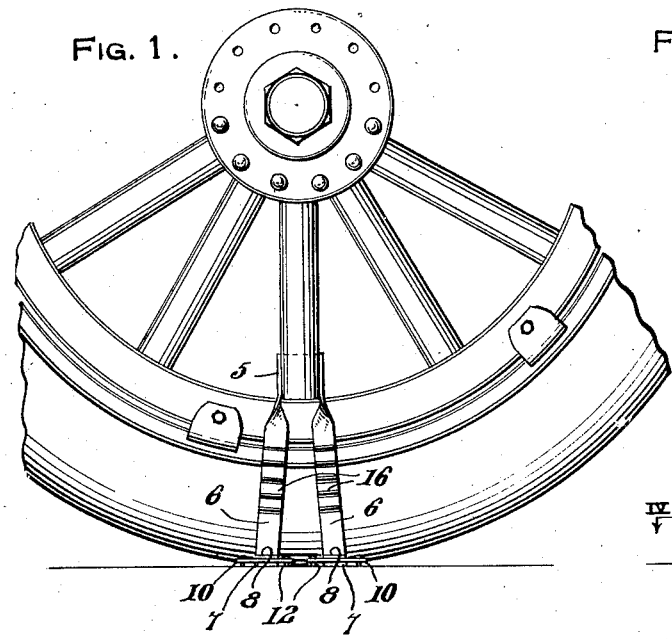
Figure 2:
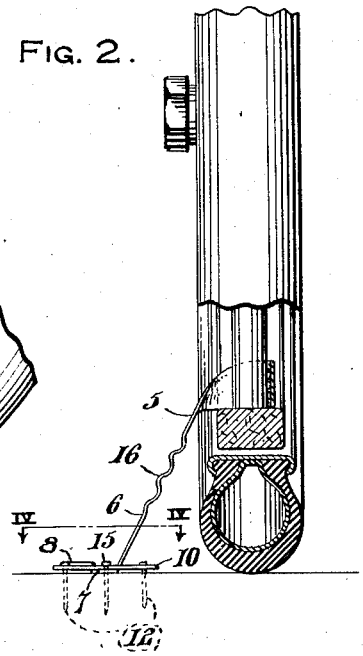
Figure 5:
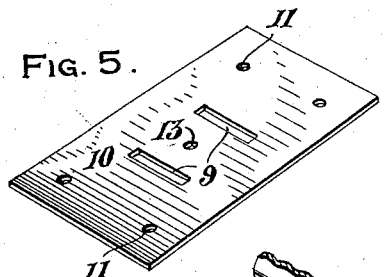
Figure 3:
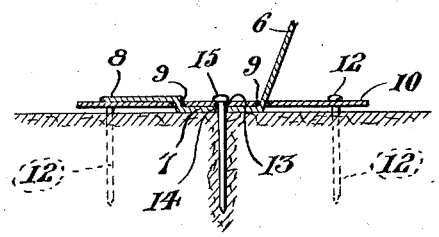
Figure 6:
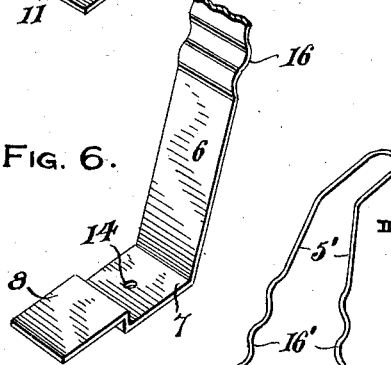
Figure 7:
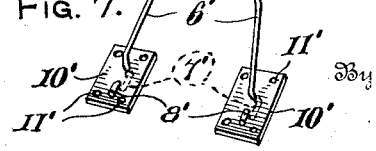
Figure 4:
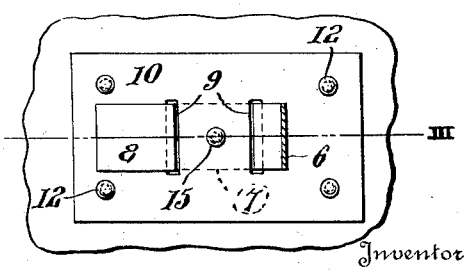

The preferred forms for the construction of the invention, and one manner of its application to practice, are clearly shown in the accompanying drawings, in which Figure 1 is a fragmentary side elevational view of an automobile wheel showing the same anchored by means of a tie-down device constructed in accordance with the present invention, Figure 2 is a view partly in edge elevation and partly in central vertical section of the device shown in Figure 1, Figure 3 is a central sectional view taken upon line III—III of Figure 4, Figure 4 is a horizontal sectional view taken upon line IV—IV of Figure 2 and drawn on a larger scale, Figure 5 is an enlarged perspective view of one of the securing plates employed with the strap of Figure 1, Figure 6 is a fragmentary perspective view showing one end portion of the strap illustrated in Figure 1 and drawn on a larger scale, and Figure 7 is a perspective view showing a modified form of the invention.

Referring more in detail to the several views and particularly to the form of the invention illustrated in Figures 1 to 6 inclusive, 5 denotes a strap formed in substantially U-shape and preferably constructed of springy or resilient sheet metal whereby the strap may fit around the spoke at the bent portion of the same, the intermediate portion of the strap being bent laterally as clearly shown in Figure 2 so that the end portions or legs 6 of the strap may extend downwardly at one side of the felly and tire of the automobile into contact with the floor of the car. The ends of the legs 6 are bent angularly to provide feet 7 which are upwardly offset as at 8 at their extreme ends, and these feet are interlocked with flat sheet metal securing plates 10 by being threaded through spaced slots 9 provided in said plates. One of said plates is provided for each foot. In this way, the extreme ends of the feet lie upon the upper surface of the plate while the remaining portions of the feet lie underneath the plate between the slots. Furthermore, the free end of the foot being bent transversely to the plate in order to pass through the slot 9 will engage the plate and be anchored thereto, that is, the sharp bend in the foot at this point will prevent the withdrawal of the foot while the device is in use. The plates 10 are provided with numerous openings or apertures as at 11 for reception of nails 12 or other similar holdfast devices whereby the ends of the strap are effectively secured. An additional opening 13 may be provided in the plate 10 between the slots 9 in a position to register with a similar opening 14 provided in each of the feet 7 through that portion of the same which lies under the plate 10 whereby a single further nail or like fastener 15 may be driven through the plate and the foot and into the floor of the freight car for preventing any possibility of the foot being pulled loose from the securing plate as well as assisting the nails 12 in anchoring the ends of the strap.

Thus it will be understood that I have provided plate-means for securing the feet to the floor of the freight car, said plate-means extending across the feet in flat engagement therewith and provided with fastening-receiving perforations at opposite sides of the feet, and also provided with fastening-receiving openings in alignment with similar openings in the feet, whereby fastenings may be driven through the aligned openings in the plate-means and the feet so as to secure together the plate-means and the feet, and also to maintain the device in place while driving fastenings through the perforations in the plate-means.

In order to allow slight displacement of the automobile under cushioned restraint, the legs 6 are corrugated transversely as at 16 or some portion of the strap is equivalently shaped, to give this result when considered with the resilient nature of the material of which the strip is formed.

Referring to Figure 7 wherein a modified form of the invention is shown, the strap 5' is shown as formed from a piece of relatively stout resilient wire into substantially U-shape, substantially as is the case with the sheet metal strip of Figure 1 and the legs 6' are corrugated as at 16' for allowing limited cushioned movement of the vehicle. In this form of the invention, a securing plate 10' is provided for each end of the tie-down device, the end portions of the legs 6' being bent angularly to provide feet portions 7' which are upwardly offset to provide end portions 8' for the feet which lie upon the upper surface of the respective plate 10' thereof when the feet are threaded through the spaced pairs of openings provided in said plates, at which time the portions 7' are disposed under the plate. In this form of the invention, the plates 10' are provided with numerous openings 11' for the reception of holdfast devices such as nails, whereby the ends of the device are securely held to the floor.

From the foregoing description, it is believed that the construction and operation of the present invention will be readily understood and appreciated by those skilled in the art as well as the advantages thereof.

Minor changes may be made without departing from the spirit and scope of the invention as claimed.

What is claimed as new is:

1. In an anchoring device of the class described, an elastically extensible strip formed into a loop and having angularly bent ends providing floor engaging feet, and securing plates having spaced openings through which said feet are threaded.

2. In an anchoring device of the class described, a flexible strip formed into a loop and having angularly bent ends providing floor engaging feet, and securing plates having spaced openings through which said feet are threaded, the extreme end portions of said feet being upwardly offset and lying upon the upper surface of the plate thereof with the remaining portion of each foot lying under its plate.

3. In an anchoring device of the class described, a flexible strip formed into a loop and having angularly bent ends providing floor engaging feet, and securing plates having spaced openings through which said feet are threaded, the extreme end portions of said feet being upwardly offset and lying upon the upper surface of the plate thereof with the remaining portion of each foot lying under its plate, said strip being of sheet metal, said feet and plates being provided with alined openings between the openings through which the feet are threaded adapted to receive a nail or like fastener for being driven into the floor whereby separation of the plates and feet is efficiently guarded against.

4. In an anchoring device of the class described, a flexible strip formed into a loop and having angularly bent ends providing floor engaging feet, and having spaced openings through which said feet are threaded, the extreme end portions of said feet being upwardly offset and lying upon the upper surface of the plate thereof with the remaining portion of each foot lying under its plate, portions of said strip being corrugated and the strip being of springy metal whereby limited movement of the automobile held by the device may be had.

5. In combination with a pair of sheet metal securing plates adapted to be secured to a car floor and each having a pair of openings therethrough, a looped flexible spoke engageing strip having angularly bent ends providing securing feet each passing downwardly through one opening of one plate and then upwardly through the other opening thereof with the extreme free ends of the feet resting upon the upper surfaces of the plates and directed outwardly.

6. Anchoring means for motor vehicles comprising a tie down formed of a strip of material bent to provide anchoring feet, a foot plate interlockingly associated with each tie down foot, and said tie down embodying a pair of legs constructed to afford elasticity in the lengthwise direction thereof.

7. Anchoring means for motor vehicles comprising a tie down formed of a strip of material bent to provide anchoring feet, a foot plate interlockingly associated with each tie down foot, and said tie down embodying a pair of legs having transverse corrugations arranged between the ends thereof.

8. Anchor means for motor vehicles comprising a tie down formed of a strip of material bent to provide a vehicle engaging loop and a pair of legs, a pair of foot plates, the ends of said legs being bent to form feet extending beneath said plates and in flat engagement therewith and permanently secured thereto, the free ends of said feet being bent to extend transversely to the plates and engaging therewith, said plates extending beyond the side edges of said feet and provided with apertures at each side of said feet for receiving fastening means.

9. An anchoring device for vehicles comprising a metallic strap bent to provide a vehicle-engaging loop, legs integral with said loop and feet integral with and disposed at an angle to the lower ends of the legs, plate-means separate from the feet for securing the feet to a support and extending across the feet in flat engagement therewith, said plate-means having perforations at opposite sides of the feet for receiving fastening devices, the plate-means and the feet having aligned openings for receiving fastening elements, and means positioning said plate-means on said feet with the said openings in the plate-means in alignment with said openings in the feet whereby said openings will be maintained in alignment for receiving attaching nails while the device is being applied.

In testimony whereof I affix my signature.

EDWARD S. EVANS.